United States Patent
Wengert et al.

(10) Patent No.: US 9,970,327 B2
(45) Date of Patent: May 15, 2018

(54) DEVICE AND METHOD FOR SEPARATING DIRT PARTICLES FROM THE WORKING MEDIUM OF A TURBINE

(71) Applicant: Robert Bosch GmbH, Stuttgart (DE)

(72) Inventors: Andreas Wengert, Backnang (DE); Hans-Christoph Magel, Reutlingen (DE); Nadja Eisenmenger, Stuttgart (DE); Frank Ulrich Rueckert, Stuttgart (DE)

(73) Assignee: Robert Bosch Gmbh, Stuttgart (DE)

( * ) Notice: Subject to any disclaimer, the term of this patent is extended or adjusted under 35 U.S.C. 154(b) by 234 days.

(21) Appl. No.: 14/898,476

(22) PCT Filed: Apr. 17, 2014

(86) PCT No.: PCT/EP2014/057850
§ 371 (c)(1),
(2) Date: Dec. 14, 2015

(87) PCT Pub. No.: WO2014/198448
PCT Pub. Date: Dec. 18, 2014

(65) Prior Publication Data
US 2016/0146056 A1    May 26, 2016

(30) Foreign Application Priority Data

Jun. 12, 2013 (DE) .................. 10 2013 210 917

(51) Int. Cl.
*B04C 5/04* (2006.01)
*F01D 25/32* (2006.01)
(Continued)

(52) U.S. Cl.
CPC .............. *F01D 25/32* (2013.01); *B01D 45/12* (2013.01); *B01D 45/14* (2013.01); *B01D 45/16* (2013.01);
(Continued)

(58) Field of Classification Search
CPC .......... B04C 5/04; B01D 45/12; B01D 45/16; F01D 25/32; F01N 1/087; F01N 1/088; F01N 3/037; F23J 15/027; F23J 2217/40
See application file for complete search history.

(56) References Cited

U.S. PATENT DOCUMENTS 4,089,631 A    5/1978  Giles
5,554,343 A *  9/1996  Wade ........................ B04B 5/08
                                                            422/177
(Continued)

FOREIGN PATENT DOCUMENTS

CH          267498      3/1950
CN       1176364 A      3/1998
(Continued)

OTHER PUBLICATIONS

Machine translation of DE 4336847 A1, accessed on Sep. 30, 2017.*
(Continued)

*Primary Examiner* — Jonathan Matthias
(74) *Attorney, Agent, or Firm* — Michael Best & Friedrich LLP

(57) ABSTRACT

The invention relates to a device and a method for separating dirt particles from the working medium of a turbine (10). The turbine (10) comprises at least one rotor (11) which is arranged in a housing (17). A swirl generator (20) is provided that sets the working medium and the dirt particles in a spiral-shaped rotational movement along a principal axis (22) by means of the geometry of the swirl generator (20) and thereby separates the dirt particles from the working medium. The swirl generator (20) is designed in such a way that the working medium experiences a reversal of the speed component parallel to the principal axis (22) within the swirl generator (20).

13 Claims, 2 Drawing Sheets

(51) Int. Cl.

| | |
|---|---|
| *B01D 45/12* | (2006.01) |
| *B01D 45/14* | (2006.01) |
| *B01D 45/16* | (2006.01) |
| *F01D 5/02* | (2006.01) |
| *F01D 9/02* | (2006.01) |
| *F01D 15/08* | (2006.01) |
| *F01D 25/08* | (2006.01) |
| *F01K 11/00* | (2006.01) |
| *F01K 23/06* | (2006.01) |
| *F01K 25/14* | (2006.01) |

(52) U.S. Cl.
CPC ............... *F01D 5/02* (2013.01); *F01D 9/02* (2013.01); *F01D 15/08* (2013.01); *F01D 25/08* (2013.01); *F01K 11/00* (2013.01); *F01K 23/065* (2013.01); *F01K 25/14* (2013.01); *F05D 2210/12* (2013.01); *F05D 2220/30* (2013.01); *F05D 2240/24* (2013.01); *F05D 2260/20* (2013.01)

(56) References Cited

U.S. PATENT DOCUMENTS

| | | |
|---|---|---|
| 2002/0008072 A1 | 1/2002 | Conrad et al. |
| 2009/0000300 A1 | 1/2009 | Hilpert |
| 2010/0205949 A1 | 8/2010 | Bolda et al. |

FOREIGN PATENT DOCUMENTS

| | | | |
|---|---|---|---|
| CN | 102575841 A | 7/2012 | |
| CN | 102628379 A | 8/2012 | |
| DE | 4336847 A1 * | 5/1995 | ............ B01D 45/12 |
| DE | 102006023589 | 11/2007 | |
| DE | 102007030277 | 1/2009 | |
| DE | 102010043405 | 3/2012 | |

OTHER PUBLICATIONS

International Search Report for Application No. PCT/EP2014/057850 dated Oct. 13, 2014 (English Translation, 2 pages).

* cited by examiner

DEVICE AND METHOD FOR SEPARATING DIRT PARTICLES FROM THE WORKING MEDIUM OF A TURBINE

BACKGROUND OF THE INVENTION

The invention relates to a device and method for separating dirt particles from the working medium of a turbine.

The European patent publication EP 2 137 397 B1 discloses an arrangement for supplying an internal combustion engine with a stream of combustion air and for removing a stream of exhaust gas, in which arrangement a swirl generator is designed as a centrifugal separator for condensate forming in the exhaust gas return stream. An effective separation can be brought about without additional measures by using the centrifugal forces or, respectively, mass inertia forces which occur anyway in the swirl generator and act on condensate that has formed.

A turbocharger for an internal combustion engine is known from the German patent publication DE 10 2007 030 277 A1. A centrifugal separator, which is coupled to the shaft, is disposed between a compressor wheel and the turbocharger in an intermediate chamber. The centrifugal separator is used as a separator for fluid/oil from the crankcases.

SUMMARY OF THE INVENTION

The device and method for separating dirt particles from the working medium of a turbine according to the invention have the advantage that a separation of dirt particles from the working medium of the turbine is implemented in a particularly compact and space-saving design. By reversing the speed component of the working medium parallel to a principal axis, the installation space of the swirl generator can be reduced approximately by half of the length otherwise required because the working medium flows twice through the same distance within the swirl generator. This is especially important for applications of turbines within motor vehicles because only a small amount of installation space is available within the engine compartment of the motor vehicle.

A device is advantageous in which the swirl generator is designed as a hollow body which is approximately rotationally symmetrical and into which a pipe protrudes that constitutes a connection to the turbine. As a result of the rotationally symmetrical hollow body, the working medium and the dirt particles experience the spiral-shaped rotational movement with the speed component parallel to the principal axis until said medium and dirt particles have arrived at the end of the hollow body. The working medium experiences a reversal of the speed component parallel to the principal axis on at least one reflection surface, i.e. a change in direction of the spiral-shaped movement during which the sign of the speed component parallel to the principal axis changes. As a result, the working medium flows in a spiral-shaped rotational movement in the opposite direction through the pipe into the housing of the turbine. Due to the inertia of the dirt particles, said particles do not experience a reversal of the speed component parallel to the principal axis and are therefore separated from the working medium. The arrangement of the pipe within the hollow body constitutes an efficient and space-saving design for separating working medium comprising dirt particles and working medium without dirt particles.

An especially compact and space-saving design of the swirl generator is ensured if the pipe which protrudes into the hollow body of the swirl generator is formed by the housing of the turbine. In this case, the swirl generator does not have to be spatially disposed upstream of the turbine but can be disposed as an approximately rotationally symmetrical hollow body around the housing of the turbine. In addition, costs are saved due to the multiple use of the same component, e.g. housing being used as pipe.

The principal rotational direction can be predefined for the spiral-shaped rotational movement by means of an inlet pipe into the swirl generator, which is designed in such a manner that the working medium has a further speed component tangential to the wall of the hollow body upon entry into the swirl generator. The principal rotational direction is to be understood here as the rotational direction of the spiral-shaped rotational movement, in which a clockwise rotational direction can be distinguished from a counter-clockwise rotational direction. This is advantageous because the flow angle at which the working medium strikes the rotor or the laval nozzles directly upstream of the rotor can be influenced by the selection of the rotational direction.

A further advantage results from an inside radius of the hollow body which decreases along the principal axis between the supply line and the outflow wall located opposite the pipe. This is advantageous because the rotational speed of the working medium containing the dirt particles increases; thus enabling the dirt particles to be thrown more strongly against the walls of the hollow body due to the higher centrifugal force and to thereby be decelerated so that they can more easily separate themselves from the flow.

The arrangement of at least one bore on the outflow wall of the hollow body that is opposite the pipe is advantageous. The dirt particles can be removed in a simple and efficient way from the swirl generator by means of an outlet line connected to the bore. This can, e.g., be implemented by the buildup of a pressure gradient.

Especially in the case of a turbine, which is disposed in a system for heat recovery in an internal combustion engine, an arrangement of a swirl generator directly upstream of the turbine for separating dirt particles from the working medium is advantageous. In the system for heat recovery in an internal combustion engine, the working medium flows through a circuit in which at least one heat exchanger, the turbine, at least one condenser and at least one pump are disposed in succession. The working medium therefore flows through the turbine a number of times and is not replaced for each passage through the turbine, as is the case in other applications as, e.g., in the case of a turbocharger or in a thermal power plant for industrial applications. As a result of the circular process within the system for heat recovery in an internal combustion engine, the working medium becomes permanently contaminated by dirt particles, as, e.g., lubricants. The dirt particles can cause damage to the turbine or other components of the aforementioned system for heat recovery as a result of erosion, deposition or droplet impact. A reduction in the dirt particles in the working medium occurs by means of the proposed device and the proposed method before each passage of said working medium through the turbine. The concentration of dirt particles in the working medium can therefore be permanently reduced.

BRIEF DESCRIPTION OF THE DRAWINGS

An exemplary embodiment of the invention is depicted in the drawings and is explained in detail in the following description.

In the drawings.

DETAILED DESCRIPTION

Figure 1:
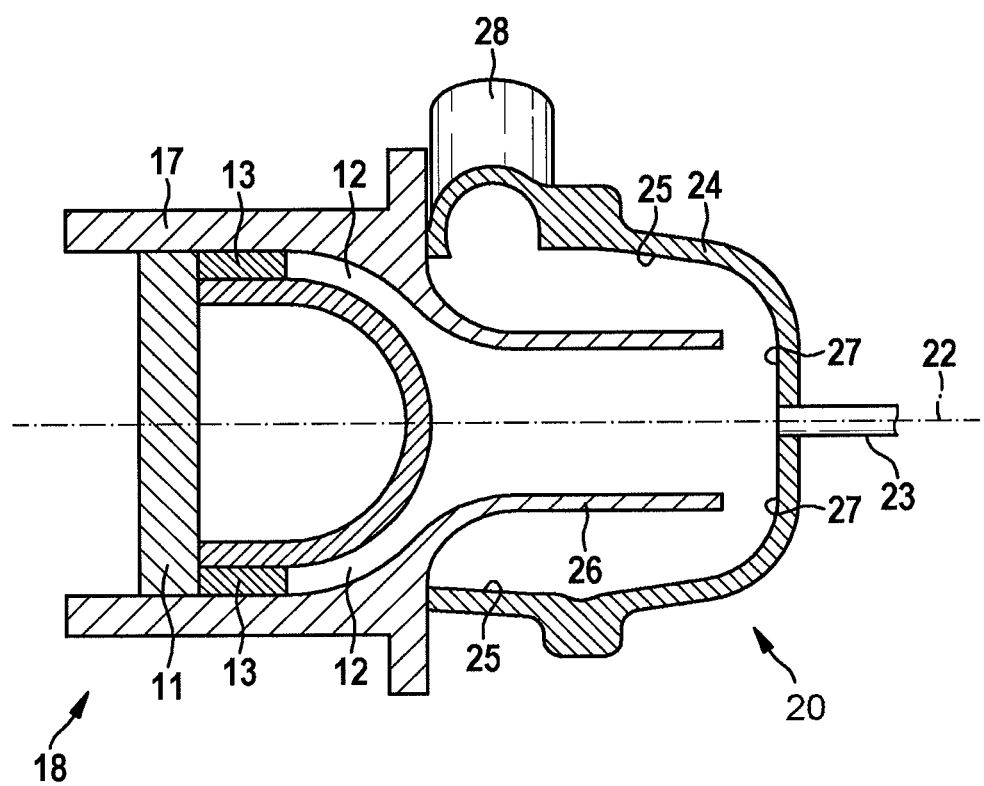
FIG. 1 shows a turbine comprising a swirl generator.

A turbine 10 comprising a rotor 11, which is disposed in a housing 17, is shown in FIG. 1. A working medium, which is used to drive the turbine, arrives at the rotor 11 via a supply line 12, said rotor being set in a rotational movement by the working medium. The kinetic energy of the rotor 11 can be converted into further energy forms.

A nozzle arrangement 13 can be disposed upstream of the rotor 11. This can be a laval nozzle which leads to an acceleration of the working medium prior to striking the rotor 11.

A swirl generator 20 is disposed directly on the input side of the turbine 10. The swirl generator 20 is formed from a hollow body 24 which is approximately rotationally symmetrical and which is fastened to the front face of the housing 17 of the turbine 10. The hollow body 24 has an inlet line 28. The working medium can move into the hollow body 24 of the swirl generator 20 by means of the inlet line 28. On account of the inlet line 28, the rotational symmetry is interrupted in at least one region of the hollow body 24.

The inlet line 28 can be designed such that the working medium has at least one further speed component parallel to an inner wall 25 of the hollow body 24.

A pipe 26, which constitutes a connection to the turbine 10, is disposed within the hollow body 24. The pipe 26 can be formed by the housing 17 of the turbine 10. The pipe can, however, also be a separate component of the swirl generator 20, which is flanged to the housing 17 of the turbine 10 by means of a connection that is as impermeable as possible. Working medium which has flowed into the swirl generator 20 moves through the pipe 26 into the supply line 12 of the turbine 10.

An outlet line 23 is disposed on an outflow wall 27 located opposite the pipe 26. The outlet line 23 can be connected to the hollow body 24 via a bore in the center of the outflow wall 27. Further positions of the bore within the outflow wall 27 are also possible. Said positions can be selected as a function of the geometry of the hollow body 24.

The device shown in FIG. 1 is used to separate dirt particles from the working medium of the turbine 10. The working medium of the turbine can be steam which is under high pressure. Other working mediums are, however, also possible which can be used to drive a turbine 10. Dirt particles can accumulate within the working medium, as, e.g., lubricants which come from the bearings of the turbine 10. These dirt particles can lead to damage within the turbine 10 due to droplet impact or erosion. In addition, undesirable depositions of dirt particles can occur within the turbine 10 or within the components downstream of the turbine 10.

In order to remove the dirt particles from the working medium of the turbine 10, the working medium containing the dirt particles is led via the inlet line 28 into the swirl generator 20 directly upstream of the turbine 10.

Figure 2:
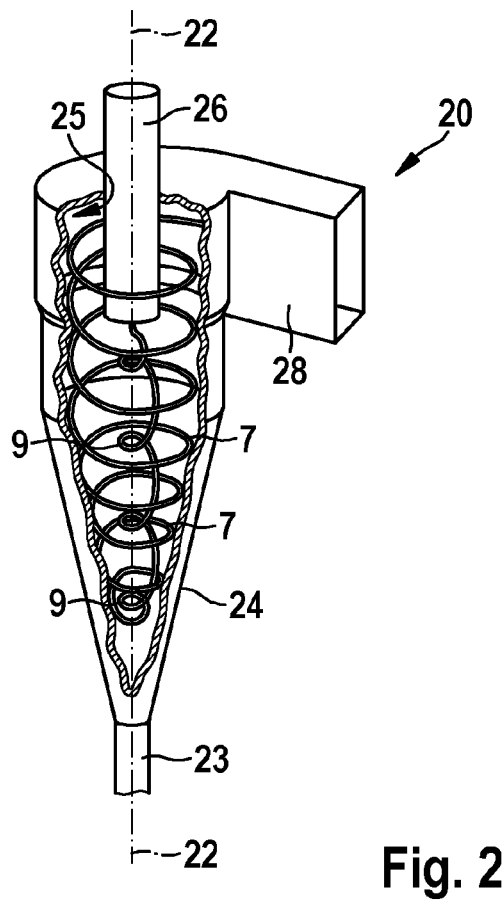
FIG. 2 shows a swirl generator.

By way of example, FIG. 2 shows how the dirt particles are removed from the working medium within the swirl generator 20. The working medium containing the dirt particles passes through the inlet line 28 into the approximately rotationally symmetrical hollow body 24. Due to the geometry of the hollow body 24 and the orientation of the inlet line 28 with respect to the inner wall 25 of the hollow body 24, the working medium containing the dirt particles is set into the spiral-shaped rotational movement with the speed component parallel to the principal axis 22. The working medium and the dirt particles move in a spiral-shaped rotational movement along an outer main vortex 7 of the inlet line 28 in the direction of the outlet line 23.

Centrifugal forces act on the working medium and the dirt particles by means of the spiral-shaped rotational movement, said centrifugal forces produce a radial force that is directed outwards on the working medium and the dirt particles. Due to the different size and thickness of the particles of the working medium and the dirt particles, a spatial separation of the working medium from the dirt particles occurs during this spiral-shaped rotational movement.

The working medium experiences a reflection on at least one reflection surface of the hollow body 24 which leads to a reversal of the speed component parallel to the principal axis 22 and therefore to a change in sign of the corresponding speed component so that an inner partial vortex 9 forms which is in the opposite direction of the outer main vortex 7. In contrast, the dirt particles do not experience a reversal of the speed component parallel to the principal axis 22 so that they continue to move in the direction of the outlet line 23. This causes a separation of working medium and dirt particles. While the working medium and the dirt particles are still situated in the outer main vortex, the proportion of dirt particles in the inner partial vortex is greatly reduced.

The at least one reflection surface can be formed by any wall of the hollow body 24. An arrangement according to FIG. 1, in which the at least one reflection surface is formed by the outflow wall 27, is particularly advantageous.

The inner partial vortex 9 moves with a spiral-shaped rotational movement in the opposite direction of the outer main vortex 7. Furthermore, the radius of the inner partial vortex 9 is smaller than the radius of the outer main vortex 7 so that a mixing of the working medium from the outer main vortex 7 and the inner partial vortex 9 hardly occurs.

The working medium of the inner partial vortex 9 moves in the direction of the pipe 26, through which the working medium passes into the supply line 12 of the turbine 20, due to the opposite speed component with respect to the main vortex 22.

In contrast, the dirt particles move in the direction of the outlet line 23 and can be removed from the swirl generator through said outlet line 23.

The hollow body 24 is formed by a cone in the depiction in FIG. 2 so that the inside radius of the hollow body 24 decreases along the principal axis 22 between the inlet line 28 and the outlet line 23 opposite the pipe 12. By means of the reduction of the inside radius, the rotational speed of the working medium increases so that the articles of dirt particles are thrown more strongly against the inner wall 25 of the hollow body 24 as a result of centrifugal force. This leads to a deceleration of the dirt particles, which thus are released from the flow and move along the inner wall 25 of the hollow body to the outlet line 23. In the case of heavy dirt particles, a separation also occurs between working medium and dirt particles if the inside radius of the hollow body 24 is only slightly reduced or not reduced at all.

Figure 3:
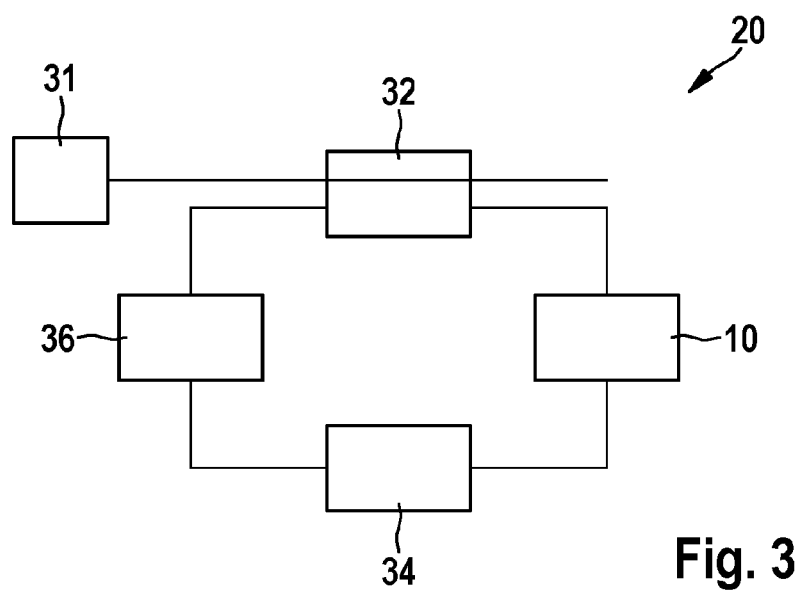
FIG. 3 shows a schematic depiction of a system for heat recovery in an internal combustion engine.

A schematic depiction of a system for heat recovery 30 in an internal combustion engine 31 is shown in FIG. 3. The system is formed by a circuit in which the turbine 10, at least one condenser 34, at least one pump 36 and at least one heat exchanger are disposed in succession. A corresponding system is described in the German patent application DE 10 2010 043 405. Corresponding explanations from said German patent application DE 10 2010 043 405 as to the functionality of a corresponding system for heat recovery are also considered to be a constituent part of this application.

The working medium passes through the system for heat recovery 30 within the framework of a circular process and, in so doing, is not exchanged. This leads to a permanent accumulation of dirt particles in the working medium so that, precisely here, the device and the method for separating dirt particles from the working medium take on a great deal of importance.

The invention claimed is:

1. A device for separating dirt particles from a working medium of a turbine (10), the turbine (10) comprising at least one rotor (11) which is arranged in a housing (17), the device comprising a swirl generator (20) configured to set the working medium and the dirt particles in a spiral-shaped rotational movement having a speed component along a first direction parallel to a principal axis (22) by means of a geometry of the swirl generator (20) and thereby separate the dirt particles from the working medium, characterized in that the swirl generator (20) has at least one reflection surface by means of which the speed component of the working medium is reversed within the swirl generator, wherein the reflection surface faces the rotor, is perpendicular to the principal axis, and is configured to redirect the working medium along a second direction that is opposite to the first direction.

2. The device according to claim 1, characterized in that the swirl generator (20) includes a hollow body (24) which is approximately rotationally symmetrical and into which a pipe (26) protrudes, the pipe being a connection to the turbine (10).

3. The device according to claim 2, characterized in that the pipe (26) which protrudes into the hollow body (25) of the swirl generator (20) is formed by the housing (17) of the turbine (10).

4. The device according to claim 2, characterized in that the swirl generator includes an inlet line (28) configured to pass the working medium into the hollow body of the swirl generator (20), the swirl generator (20) configured such that the working medium has a further speed component tangential to an inner wall (25) of the hollow body (24).

5. The device according to claim 4, characterized in that an inside radius of the hollow body (24) decreases along the principal axis (22) between the inlet line (28) and an outflow wall (27) located opposite the pipe, wherein the outflow wall (27) includes the reflection surface.

6. The device according to claim 5, characterized in that at least one outlet line (23) for dirt particles is disposed on the outflow wall (27).

7. An internal combustion engine comprising the device according to claim 1, wherein the turbine (10) is disposed in a system for heat recovery (30) in the internal combustion engine (31), in which system the working medium passes through a circuit, wherein at least one heat exchanger (32), the turbine (10), at least one condenser (34) and at least one pump (36) are disposed in succession.

8. The device according to claim 1, wherein the housing (17) forms a pipe (26) that extends into the swirl generator (20), wherein the reflection surface is configured to redirect the working medium into the pipe (26) along the second direction.

9. The device according to claim 8, wherein a nozzle (13) is disposed within the housing (17) between the pipe (26) and the rotor (11).

10. The device according to claim 1, wherein the reflection surface is flat.

11. The device according to claim 1, wherein the device includes an outlet wall that includes the reflection surface, wherein the device further includes at least one outlet line (23) having an inlet opening in the reflection surface, wherein the inlet opening is configured such that the dirt particles enter the inlet opening along the first direction and the working medium moves along the opposite, second direction.

12. A method for separating dirt particles from a working medium of a turbine (10), the turbine (10) comprising at least one rotor (11) which is disposed in a housing (17), the method comprising providing a swirl generator (20) configured to set the working medium and the dirt particles into a spiral-shaped rotational movement (7, 9) having a speed component along a first direction parallel to a principal axis (22) and thereby separate the dirt particles from the working medium, and causing the working medium to experience a reversal of the speed component parallel to the principal axis (22) by means of at least one reflection surface of the swirl generator (20), wherein the reflection surface faces the rotor, is perpendicular to the principal axis, and is configured to redirect the working medium along a second direction that is opposite to the first direction, whereas the dirt particles are separated through an outlet line (23) due to a higher inertia thereof in comparison to the working medium.

13. The method according to claim 12, characterized in that the swirl generator (20) includes a hollow body (24) that is approximately rotationally symmetrical and the working medium is caused to flow with a further speed component tangentially to an inner wall (25) of the hollow body (24).

* * * * *